United States Patent [19]
Nishio et al.

[11] Patent Number: 4,997,244
[45] Date of Patent: Mar. 5, 1991

[54] OPTICAL WAVELENGTH CONVERTING DEVICE AND MANUFACTURING METHOD THEREOF

[75] Inventors: Yoshitaka Nishio; Yuji Hamada, both of Osaka; Takanori Fujii, Hyogo; Masakazu Sakata; Yoshikazu Tsujino, both of Osaka; Kazuhiko Kuroki, Kyoto, all of Japan

[73] Assignee: Sanyo Electric Co., Ltd., Osaka, Japan

[21] Appl. No.: 438,162

[22] Filed: Nov. 16, 1989

[30] Foreign Application Priority Data

Dec. 8, 1988 [JP] Japan ................... 63-311369

[51] Int. Cl.$^5$ .................... G02B 6/10; H03F 7/00
[52] U.S. Cl. .................... 350/96.12; 307/430; 350/96.15; 350/96.29; 350/96.34
[58] Field of Search ............. 350/96.10, 96.11, 96.12, 350/96.13, 96.14, 96.15, 96.29, 96.30, 96.34; 307/425–430

[56] References Cited

U.S. PATENT DOCUMENTS

| | | | |
|---|---|---|---|
| 3,856,379 | 12/1974 | Burns et al. | 350/96.13 |
| 4,431,263 | 2/1984 | Garito | 350/96.34 |
| 4,515,429 | 5/1985 | Smith et al. | 350/96.13 |
| 4,536,450 | 8/1985 | Garito | 350/96.34 X |
| 4,783,136 | 11/1988 | Elman et al. | 350/96.12 |
| 4,787,714 | 11/1988 | Greene et al. | 350/96.13 X |
| 4,886,339 | 12/1989 | Scozzafava et al. | 350/96.34 |

FOREIGN PATENT DOCUMENTS 62-75425 4/1987 Japan.

OTHER PUBLICATIONS

"Journal of Molecular Electronics", vol. 1, 1985, J. Zyss, pp. 25-45.
"Journal of Molecular Electronics", vol. 1, 1985, M. Sugi, pp. 3-17.

Primary Examiner—John D. Lee
Attorney, Agent, or Firm—Darby & Darby

[57] ABSTRACT

An optical wavelength converting device includes a substrate, and a waveguide layer of a nonlinear organic material formed on one major surface of the substrate and having a thickness tapered along one axis parallel to the major surface, in which a waveguide with a desired thickness can be selected in a direction normal to the axis.

9 Claims, 2 Drawing Sheets

OPTICAL WAVELENGTH CONVERTING DEVICE AND MANUFACTURING METHOD THEREOF

BACKGROUND OF THE INVENTION

1. Field of the Invention

The present invention relates generally to devices for converting a wavelength of light into a harmonic, and more particularly to improvements in an optical wavelength converting device including an optical waveguide of a thin organic film and a method of manufacturing the device.

2. Description of the Background Art

Recently, in the field of optoelectronics, a device for converting a wavelength of light into a harmonic employing a nonlinear optic effect has been extensively studied. Such an optical wavelength converting device can be employed, for example, for converting a wavelength of laser light into a harmonic.

One of wavelength converting devices, known to those skilled in the art, is of a bulk crystal type which requires a monocrystalline material having birefringence to obtain phase matching. Meanwhile, the devices of optical waveguide type and optical fiber type are also known which can obtain phase matching without a material having the birefringence. However, as for a waveguide-type wavelength converting device including a waveguide layer formed on a substrate, the waveguide layer should be accurately controlled to have a suitable thickness to obtain the phase matching.

It has been understood in general that organic materials have a higher nonlinear coefficient than inorganic materials, and thus the wavelength converting device including a waveguide layer of an organic material can have a wavelength conversion efficiency several hundred times larger than that of the one including a waveguide layer of an inorganic material.

Japanese Patent Laying-Open No. 62-75425 (1987), for example, discloses a wavelength converting device including an optical waveguide layer formed of an LB film of a nonlinear organic material formed on a substrate by an LB (Langmuir-Blodget) technology. The mechanism of generation of harmonics in the waveguide layer of the nonlinear organic material is, for example, described in detail in "Journal of Molecular Electronics", Vol. 1, 1985, pp.25–45 by J. Zyss. Further, the LB technology is, for example, described in detail in "Journal of Molecular Electronics" Vol. 1, 1985, pp. 3–17 by M. Sugi. The LB film has its thickness accurately controllable relatively easily.

The wavelength converting device of the related art includes the waveguide layer of the LB film having a definite thickness controlled to obtain phase matching with respect to an input laser beam having a specific wavelength. Therefore, the wavelength converting device designed for the input laser beam with a specific wavelength cannot be employed for another input laser beam with a different wavelength.

Meanwhile, in an erasable optical disk employing a photochromic material, a write laser beam and a read laser beam with different wavelengths to each other are sometimes employed. Two wavelength converting devices are required in converting in wavelength for these two laser beams with different wavelengths.

SUMMARY OF THE INVENTION

In view of the above described related art, an object of the present invention is to provide a wavelength converting device which can be employed for plural kinds of laser beams having different wavelengths.

Another object of the present invention is to provide a device which can simultaneously convert in wavelength with respect to plural kinds of laser beams.

A further object of the present invention to provide a compact wavelength converting device which can be employed for plural kinds of laser beams.

A still further object of the present invention is to provide an easy and inexpensive manufacturing method of a wavelength converting device which can be employed for plural kinds of laser beams.

In accordance with one aspect of the present invention, an optical wavelength converting device comprises a substrate, and a waveguide layer of a nonlinear organic material formed on one major surface of the substrate and having a thickness monotonically varying, i.e. tapered and preferably linearly tapered along one axis parallel to the major surface, in which a waveguide having a desired thickness can be selected in a direction normal to the axis.

In accordance with another aspect of the present invention, a method of manufacturing an optical wavelength converting device comprises the steps of forming a monomolecular layer of an organic material on a liquid surface, stacking a multilayer of the monomolecular layer on one major surface of the substrate by reciprocating the substrate vertically to and across the monomolecular layer, the multilayer being formed in a taper by varying the amount of the vertical movement of the substrate and being made a waveguide layer by polymerization.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
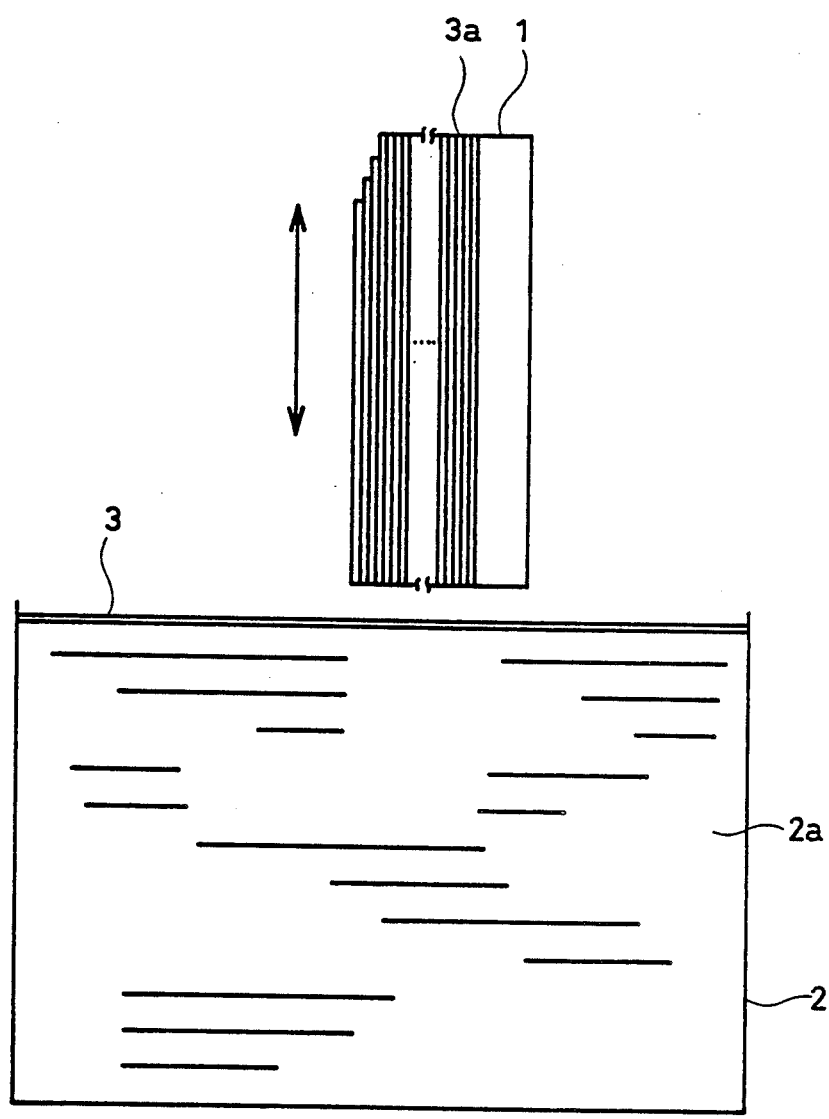
FIG. 1 is a schematic vertical section showing a method of manufacturing a wavelength converting device according to one embodiment of the present invention.

FIG. 1 schematically illustrates a method of manufacturing a wavelength converting device according to one embodiment of the present invention. Referring to this figure, distilled water $2a$ is contained in a trough 2. On the surface of the water $2a$, molecules of Cd salt of the diacetylenecarboxylic acid (e.g., 10,12-Nonacosadiynoic Acid: $H_{33}C_{16}-C\equiv C-C\equiv C-C_8H_{16}COOH$) are dispersed. These organic molecules are aggregated by a barrier (not shown) to form a solid film 3 of a monomolecular layer. In the monomolecular layer 3, the organic molecules are aligned with their hydrophilic groups direct downward and their hydrophobic groups direct upward.

A substrate 1 of quartz is reciprocated vertically to and across the organic molecular layer 3 formed on the surface of the water $2a$. One organic monomolecular layer 3 is transferred onto one major surface (e.g., an area of 20 mm×30 mm) of the substrate 1 for each movement of the substrate 1. This is the step of forming an organic film by the LB method.

First, 200 organic monomolecular layers 3a (about 0.8 μm in thickness) are deposited on a whole region of the major surface of the substrate 1 by the normal LB method. Next, a thickness to which the substrate 1 is dipped in the water is decreased by 0.5 mm for each reciprocating motion of the substrate 1, thereby stacking the plurality of organic monomolecular layers 3a in steps. The multiple organic monomolecular layer 3a formed in taper as described above is irradiated with ultraviolet rays to be polymerized and is then converted into an optical waveguide layer of polydiacetylene.

Figure 2:
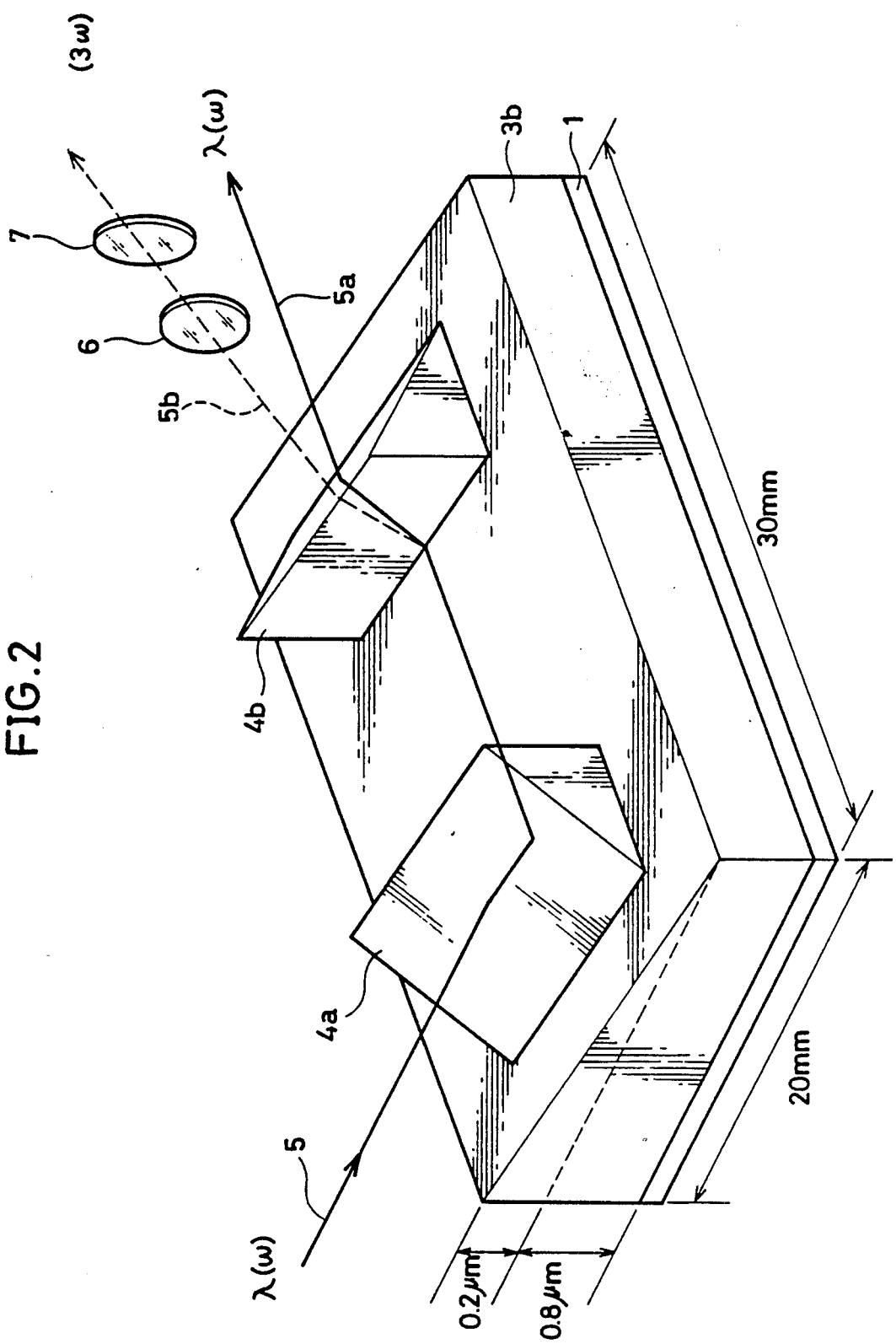
FIG. 2 is a schematic perspective view of the wavelength converting device according to one embodiment of the present invention.

FIG. 2 schematically illustrates usage of the complete wavelength converting device. A pair of prism couplers 4a, 4b are provided on a waveguide layer 3b of polydiacetylene formed in taper. For example, a YAG laser beam 5 having a wavelength $\lambda = 1.6$ μm (an angular frequency $\omega$) is direct to the first prism coupler 4a. A third harmonic with a wavelength $\lambda/3$ (an angular frequency $3\omega$) is generated while the laser beam propagates in the waveguide layer 3b. The third harmonic is separated from a fundamental wave by the second prism coupler 4b. That is, the third harmonic beam 5b to be outputted from the second prism coupler 4b is in a different direction from the fundamental wave beam 5a outputted. It is possible to accomplish this because the third harmonic and the fundamental wave in the prism 4b have different refractive indexes from each other. The third harmonic beam 5b is passed through a filter 6 and a polarizer 7, resulting in a purified high-quality harmonic laser beam.

In the wavelength converting device of FIG. 2, since the waveguide layer 3b is formed in taper, a thickness of a waveguide necessary to obtain phase matching can be selected by moving a point that the laser beam 5 is direct to the first prism 4a in the axial direction of the prism. That is, the wavelength converting device according to the present invention can be employed for plural kinds of laser beams with different wavelengths. Further, according to the present invention, it is possible for one wavelength converting device to simultaneously carry out wavelength conversions of different kinds of laser beams.

While 10, 12-Nonacosadiynoic Acid: $H_{33}C_{16}-C\equiv C-C\equiv C-C_8H_{16}COOH$ is employed in the above embodiment, 10,12 Heptacosadiynoic Acid $(H_{29}C_{14}-C\equiv C-C\equiv C-C\equiv C-C_8H_{16}COOH)$; 10,12-Pentacosadiynoic Acid $(H_{25}C_{12}-C\equiv C-C\equiv C-C_8H_{16}COOH)$; and 10,12-Tricosadiynoic Acid $(H_{21}C_{10}-C\equiv C-C\equiv C-C_8H_{16}COOH)$ can alternatively be used. Moreover, while the organic molecules are spread on the water surface in the above described embodiment, these molecules may be spread on a suitable solution. In addition, it will be understood that the waveguide layer is not only formed of polydiacetylene but also can be formed of other nonlinear organic materials which can employ the LB method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical wavelength converting device comprising:
    a substrate, and
    a waveguide layer of a nonlinear organic material formed on one major surface of said substrate and having a thickness tapered along one axis parallel to said substrate major surface, said waveguide layer having a desired thickness available for selection in a direction normal to said axis.

2. The optical wavelength converting device of claim 1, wherein
    said waveguide layer is formed of polydiacetylene.

3. The optical wavelength converting device of claim 1, wherein
    said substrate is formed of quartz.

4. The optical wavelength converting device of claim 1 further comprising:
    a pair of prism couplers provided parallel to said axis and spaced away from each other by a predetermined distance on said waveguide layer.

5. A method of manufacturing an optical wavelength converting device comprising the steps of:
    forming a monomolecular layer of an organic material on a liquid surface, and
    stacking a multilayer of said monomolecular layer on one major surface of a substrate by reciprocating said substrate vertically to and across said monomolecular layer,
    said multilayer being formed in taper by varying the amount of the vertical movement of said substrate, and
    polymerizing said multilayers of monomolecular layer to form an optical waveguide layer.

6. The method of claim 5, wherein
    said organic material is Cd salt of diacetylene carboxylic acid.

7. The method of claim 6, wherein said multilayer is polymerized by ultraviolet energy being impinged thereon.

8. The method of claim 5, wherein
    said liquid is water.

9. The method of claim 5, wherein said substrate is formed of quartz.

* * * * *